Jan. 20, 1942.                G. ROLLIN                2,270,476
            APPARATUS FOR MEASURING PRESSURE
                   Filed Aug. 29, 1939

Inventor,
G. Rollin
By: Glascock Downing & Seebold
Attys.

Patented Jan. 20, 1942

2,270,476

UNITED STATES PATENT OFFICE 2,270,476

APPARATUS FOR MEASURING PRESSURE

Georges Rollin, Fives-Lille, Nord, France, assignor to Groupement Francais pour le Developpement des Recherches Aeronautiques, Paris, Seine, France, a company of France Application August 29, 1939, Serial No. 292,537
In France September 19, 1938

5 Claims. (Cl. 73—213)

The present invention relates to sounding apparatus adapted for determining the static pressure in a fluid in turbulent movement, independently of the variations of the value of its speed and of its changes of direction in the region in question, provided the direction will not differ from a known direction by an angle of more than 30°.

The sounding apparatus is chiefly adapted for use upon aeroplanes, in all cases in which the determination of the static pressure in the surrounding fluid medium is required in view of a given application, such as the measurement of altitude by the barometric method, or the measurement of variations of altitude, or the like. The apparatus is chiefly characterized by the fact that it comprises a chamber which communicates with apparatus for indicating and/or registering the static pressure, and in which the air (or other fluid) enters at the dynamic pressure through an orifice situated in a cavity which is open at the front and has the form of a convergent funnel, and from which the air issues through one or more calibrated orifices situated in the rear part in a region of vacuum, the total cross-section of such orifices being such that the pressure in the chamber will be equal to the static pressure to be measured.

The cavity open at the front preferably consists of a tube forming a venturi which passes entirely through the sounding apparatus, the dynamic pressure being taken at the neck of the tube.

It is also preferable that the body of the sounding apparatus shall have a spherical or like form, with the venturi in the diametrical position, the orifices for taking the vacuum being situated in the rear of the diametrical plane perpendicular to the venturi.

Further characteristics will be set forth in the following description.

In the accompanying drawing, which is given solely by way of example:

Figure 1:
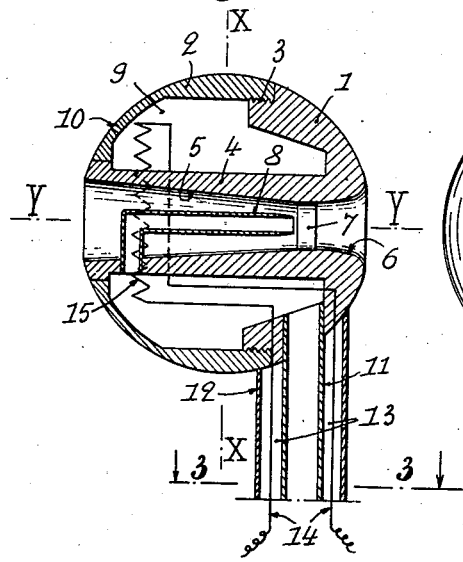
Fig. 1 is a vertical lengthwise section, on the line I—I of Fig. 2, of a sounding apparatus according to the invention.
Figure 2:
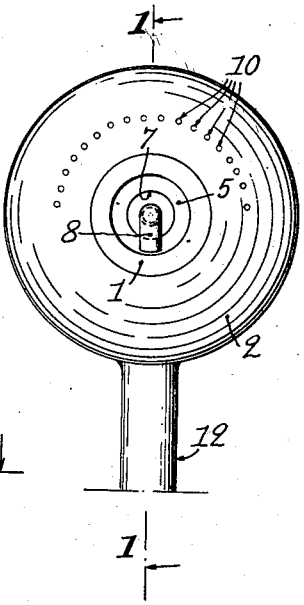
Fig. 2 is a view of the rear part.
Figure 3:
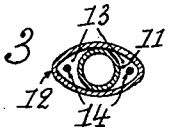
Fig. 3 is a cross-section, on the line 3—3 of Fig. 1, of the column carrying the spherical body of the sounding apparatus.

In the embodiment shown in Figs. 1 to 3, the sounding apparatus comprises a spherical body consisting, for example, of two members 1 and 2 which are joined at 3. The member 1 includes an axial tubular part 4 having a convergent and divergent bore forming a venturi, whose inlet 6 has the forward position.

The cylindrical neck 7 of this venturi is connected by a tube 8 to a chamber 9 formed between the members 1 and 2. The chamber 9 has an outlet in the rear of the vertical diametrical plane XX through a circular row of small orifices 10 which are preferably situated at about 40° from the rear end. The chamber 9 has an outlet tube 11 adapted to be connected with the chamber of a pressure-gauge which is of the indicating and/or the recording type. The tube 11 which serves as a support is preferably situated in front of the middle plane XX and the orifices 10 are preferably placed in the upper hemisphere. A second tube 12 having a suitable profile surrounds the first-mentioned tube, and the two spaces 13 between the tubes 11 and 12 provides passages for electric conductors 14 supplying a heating resistance 15 for the prevention of frost, which is mounted in the chamber 9 to prevent the clogging of the orifices 10 by frost.

The diameter of said sphere cannot be of any possible dimension. In fact it must be sufficient to contain the heating resistance, and its dimensions are limited by the fact that the aeroplane shall not be subjected to an excessive additional back flow, and also by the critical rate of flow of the fluid streams around the sphere. Taking 350,000 as the critical number of Reynolds units, and considering that an aeroplane can travel at an altitude as high as 10,000 metres, at a speed of 700 kilometers per hour, this will represent a diameter of 60 millimeters; for which the rate of flow around the sphere will always be constant for the flight of this aeroplane at all the lower altitudes. This diameter can be adopted, as it is compatible with the requirements of construction.

The cross-section of the orifices 10 is determined in such manner that in the chamber 9, the outputs of air of the intake of dynamic pressure in the neck 7 of the venturi 5 and of the intake of vacuum through the orifices 10 at the rear part of the sphere will be balanced, thus providing the static pressure desired. Obviously, this will only be of interest if the two intakes are independent as regards pressures and within wide limits, of the direction of the fluid, and if the ratio between the dynamic pressure and the vacuum remains constant within wide limits of speed. Such considerations have been found to be correct when the inlet of the venturi is 19 millimeters with a neck dimension of 9 millimeters and an outlet of 18 millimeters, with seventeen orifices 10 of 0.8 millimeter spaced apart by 10 degrees on a semi-circle at 40 degrees from the axis of the venturi. The intake of pressure at the neck of the venturi shows an exactly horizontal line from about −70° to +70° in the difference between the direction of the fluid streams and the axis YY of the venturi. The intake of the vacuum at the rear part shows a reasonably good horizontal line for angular differences of +45° to −45°, and a vacuum of 45% of the dynamic pressure. The combination of the dynamic pressure taken at 7 with the vacuum taken at 10 will afford the static pressure in the chamber 9 of the sphere. The operation has been carried out up to a dynamic pressure of 56 millimeters of water, corresponding to 30 millimeters per second. For this dynamic pressure, the static pressure showed a horizontal line which is exactly rectilinear for an angular difference of −25° to +25° between the direction of the fluid streams and the axis YY, and upwards of this difference, the pressure slightly increases by 1 or 2%, and then suddenly drops for +45° difference.

As will be observed, the sounding apparatus according to the invention provides for a great latitude in its direction with regard to the fluid streams, as compared with the known detectors, for which the difference cannot exceed 5 to 10°.

Figure 4:
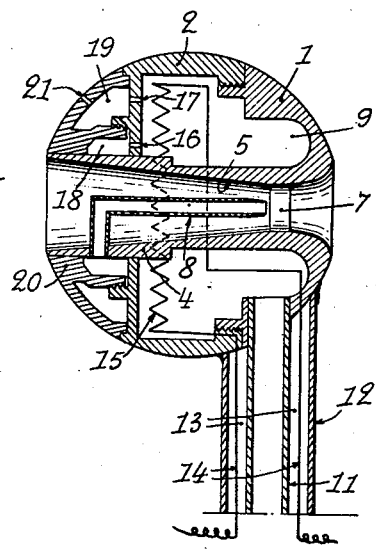
Fig. 4 is a vertical section of a modification.

Fig. 4 shows a modification in which the chamber 9 is connected by one or more small calibrated orifices 16 and 17 with two auxiliary annular chambers 18 and 19 which are provided, for instance, between the members 2 and 4, and a member 20 situated at the back part of the sphere. The chamber 18 communicates with the tube 8 adapted for the offtake of the dynamic pressure at the neck 7 of the venturi 5. The chamber 19 has an outlet through one or more orifices 21 at the back part of the sphere, and said orifices 21 have an ample size in order that they may be partly stopped up without changing the pressure in the chamber 9. This construction has the advantage of placing the calibrated orifices 16 and 17 out of the direct contact with the air, and quite near the source of heating by the resistance 15, so that they cannot be stopped up by minute drops of water.

Obviously, the invention is not limited to the embodiments herein described and represented, which are given solely by way of example.

The vertical supports 11 and 12 used with the apparatus may be bent into the horizontal or oblique position at a few centimetres below the apparatus, according to the requirements of the assembling.

Having now described my invention what I claim as new and desire to secure by Letters Patent is:

1. In an apparatus for measuring the static pressure in a turbulent fluid medium comprising, a hollow body providing a chamber therein and having a front end adapted to be directed towards an on-coming current of the fluid medium and a rear end, a conduit in said chamber extending from the front to the rear end and having an inner wall surface converging toward the front end of the body and thereafter flaring outwardly and opening on the front end of said body, a tube having an open end arranged in the narrowest cross sectional area of said conduit and directed towards the front end of said body and communicating with said chamber, the rear end of said body having a series of orifices therein arranged laterally of the axis of the conduit communicating with the chamber and of such cross sectional area that the pressure in said chamber will be equal to the static pressure to be measured, and an outlet supporting tube communicating with said chamber and extending from said hollow body in a direction diametrically opposite said orifices.

2. Apparatus for measuring the static pressure in a turbulent fluid medium comprising, a hollow body providing a chamber therein and having a front end adapted to be directed towards an on-coming flow of the fluid medium and a rear end, a Venturi tube traversing the hollow body from the front end to the rear end, a tube having an open end arranged in the narrowest portion of the Venturi tube and directed towards the front end of said body, the other end of said tube extending transversely of the Venturi tube and opening in said chamber, the rear end portion of said body having a plurality of orifices communicating with said chamber and of such cross sectional area that the pressure in said chamber will be equal to the static pressure to be measured, and means for connecting the chamber to pressure measuring apparatus.

3. Apparatus for measuring the static pressure in a turbulent fluid medium comprising, a hollow body providing a chamber therein and having a front end adapted to be directed towards an on-coming current of the fluid medium and the rear end, a Venturi tube traversing the hollow body from the front end to the rear end thereof, a tube having an open end extending from the narrowest cross sectional portion of the venturi into communication with said chamber, the rear end portion of said body having orifices therein communicating with said chamber and of such cross sectional area that the pressure in said chamber will be equal to the static pressure to be measured, and said orifices being arranged at an angle of approximately 40° with respect to the axis of said Venturi tube.

4. Apparatus for measuring the static pressure in a turbulent fluid medium comprising, a hollow body providing a chamber therein and having a front end adapted to be directed towards an on-coming current of the fluid medium and a rear end, a Venturi tube traversing said hollow body from the rear end to the front end, a tube having an open end arranged adjacent the narrowest cross sectional portion of said Venturi tube and communicating with said chamber, the rear end portion of said body being provided with orifices communicating with said chamber and of such cross sectional area that the pressure in said chamber will be equal to the static pressure to be measured, two tubes for supporting said body one communicating with said chamber and the other tube surrounding said first tube and spaced therefrom.

5. Apparatus for measuring the static pressure in a turbulent fluid medium comprising, a hollow body providing a chamber and having a front end adapted to be directed towards an on-coming current of the fluid medium and a rear end, a conduit traversing said hollow body and extending from the front to the rear ends thereof, said conduit having an inner wall surface converging towards the front end of said body and thereafter flaring outwardly and merging with the outer front end of said body, a tube having an open end extending from the narrowest cross sectional portion of said conduit into communication with said chamber, the rear end of said body having orifices therein, baffle means within said chamber extending between said conduit and said hollow body, said baffle means having calibrated apertures therein of such cross sectional area that the pressure in said chamber will be equal to the static pressure to be measured, and means communicating with said chamber for supporting the hollow body and connecting the chamber to pressure measuring apparatus.

GEORGES ROLLIN.